United States Patent [19]

Weber

[11] Patent Number: 4,468,021
[45] Date of Patent: Aug. 28, 1984

[54] PICKUP AND DEACCELERATION DRIVE OF A SHEET CONVEYOR

[75] Inventor: Friedrich Weber, Brensbach, Fed. Rep. of Germany

[73] Assignee: Maschinenfabrik Goebel GmbH, Darmstadt, Fed. Rep. of Germany

[21] Appl. No.: 420,483

[22] Filed: Sep. 20, 1982

[30] Foreign Application Priority Data

Sep. 18, 1981 [EP] European Pat. Off. ......... 817100464

[51] Int. Cl.³ .......................................... B65H 39/08
[52] U.S. Cl. .................................................. 270/60
[58] Field of Search ....................... 270/60, 52, 13, 14, 270/19, 38, 47, 58, 57; 474/72, 84

[56] References Cited

U.S. PATENT DOCUMENTS

| 2,211,418 | 8/1940 | Hallden | 164/69.1 |
| 2,861,635 | 11/1958 | Orr | 164/69.1 |
| 4,260,144 | 4/1981 | Trutschel et al. | 270/14 |

FOREIGN PATENT DOCUMENTS

| 400477 | 8/1924 | Fed. Rep. of Germany | 270/60 |
| 2657861 | 9/1978 | Fed. Rep. of Germany | 270/60 |
| 901816 | 7/1962 | United Kingdom | 270/57 |

Primary Examiner—E. H. Eickholt
Attorney, Agent, or Firm—Watson, Cole, Grindle & Watson

[57] ABSTRACT

An arrangement, for the drive of a sheet conveyor connected to a sheet processing machine, facilitates the uniform movement of sheets to a pick-up station and the non-uniform movement of the sheets accumulated thereat to a discharge station. The arrangement includes a planetary gear train having first and second planetary gear drives which are interconnected and are counter-rotated, and a flywheel mass modulates the accelerated and decelerated drive which is provided for conveying the sheets from the pick-up to the discharge stations.

2 Claims, 12 Drawing Figures

U.S. Patent  Aug. 28, 1984  Sheet 1 of 4  4,468,021
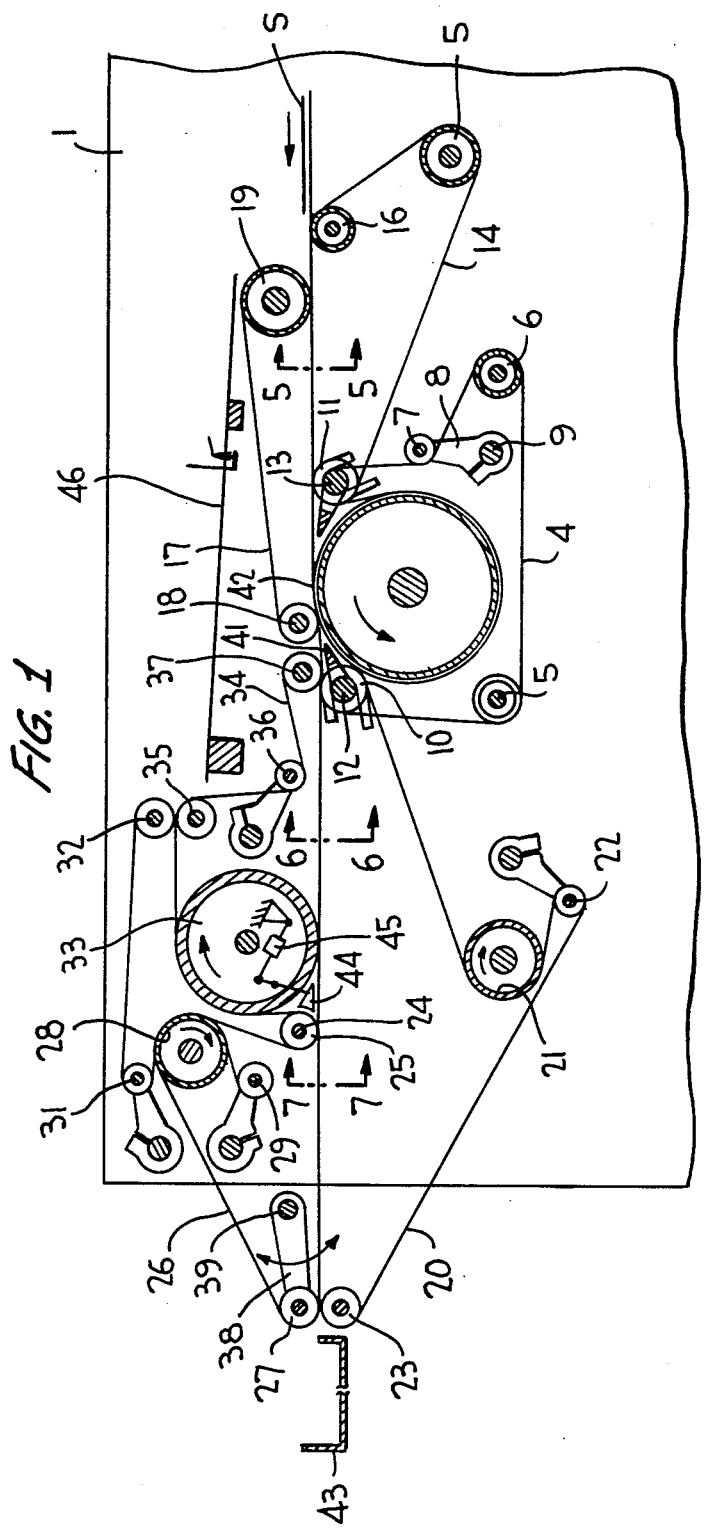
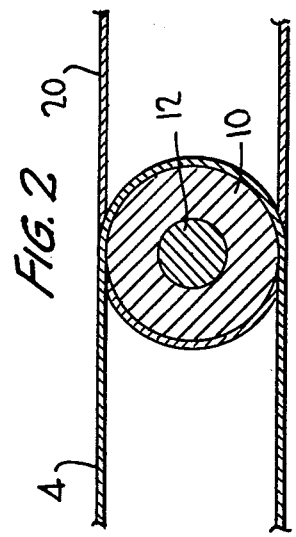

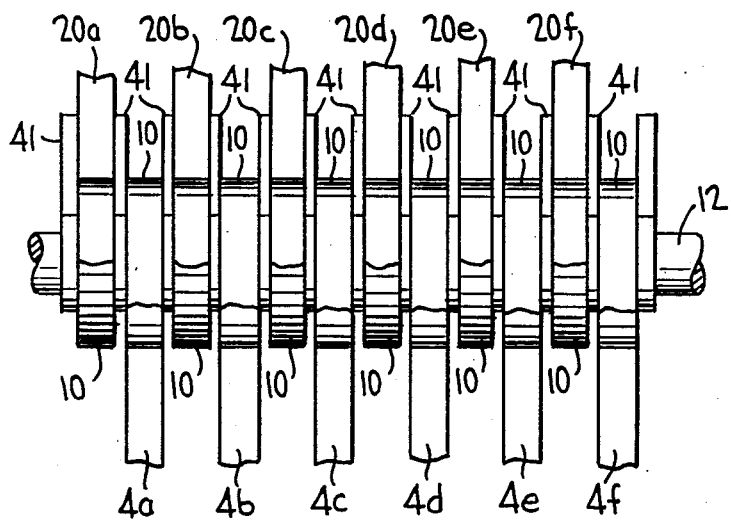
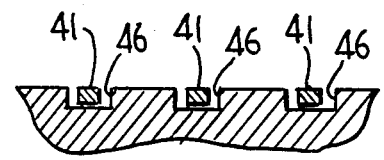
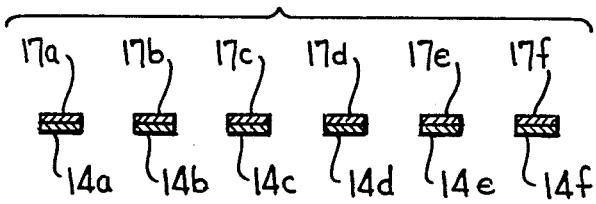
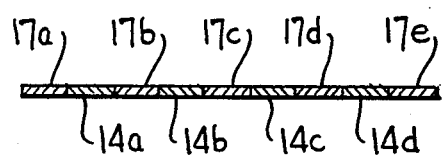
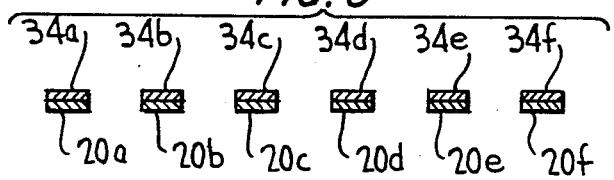
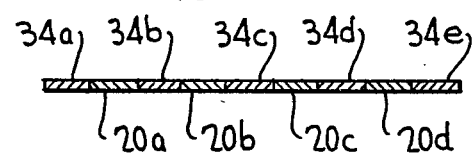
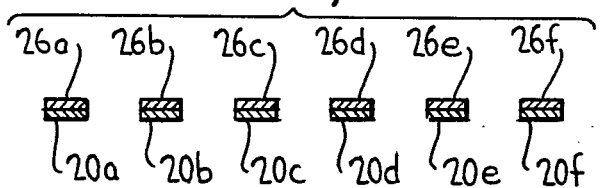
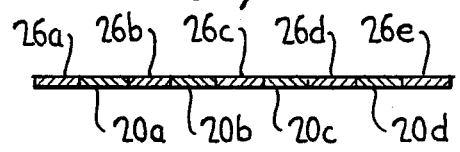

PICKUP AND DEACCELERATION DRIVE OF A SHEET CONVEYOR

BACKGROUND OF THE INVENTION

This invention relates to the drive of a sheet conveyor which is connected to a machine adapted for processing sheets of paper, film, fabrics, metals or the like. The arrangement includes a planetary gear train having a uniform drive and a non-uniform drive, the former being connected to internal gearing of the gear train, and the latter being connected to a cross-bar or crank lever which is operated by the uniform drive. The output of the non-uniform drive is connected to the sheet conveyor for picking up and decelerating the sheets to be discharged.

A sheet conveyor of this general type is disclosed in West German Pat. No. 400,477 wherein sheets of paper, film, fabrics, metals or the like are conveyed after being processed in one form or another. The sheets are processed by passing them through a printing machine, and the sheets can be produced by printing or stamping a continuous web in the printer and cutting them into individual sheets with a cross-cutter or the like after the printing or stamping process.

During the processing operation, the sheets or webs are conveyed at line speed through the processing machine, e.g., a printer. After the sheets have been processed in the desired manner, e.g., by printing or stamping, they are discharged into a receptacle. When the sheets are so discharged, their edges strike a wall of the receptacle, so that considerable forces are exerted on these edges. Since the line speeds of the processing machines are generally high, the edges of the sheets are likely to be unduly damaged if the sheets are discharged at full line speed of a machine such as a printer or a cross-cutter. Therefore, several sheets are normally collected on a collection drum after the processing operation, and are then conveyed onto a moving chain. One or more grippers or the like are attached to this chain for seizing the sheets and holding them during the conveying process until they have arrived at a take-off point. The chains, in turn, are driven by a variable speed drive, which enables them to take off a package of several sheets at the line speed of the collecting cylinder whereafter the conveyed sheets are decelerated to one-fifth the line speed, if five sheets have been accumulated, so that they may be subsequently deposited at a reduced speed into the container or receptacle. The chain, including the grippers attached thereto is again accelerated for taking up the next package of sheets from the collecting drum. Because of the variable speed operation of the chain and of the grippers attached thereto and of the chain-positioning equipment, etc., relatively large masses must be accelerated and decelerated during movement of the sheet conveyors. This results in rather substantial inertia forces which, as can be appreciated, influence the drive of the sheet conveyor. For reasons of economy, such drive is normally mechanically connected to the drive provided for the remainder of the machine, for example the drive for the printer or the cross-cutter. Thus, because of the variable speed operation of the conveyor, variable inertia forces are generated which influence the drive of the entire machine, which thereby oftentimes adversely affect the operation of the processing machine upstream of the conveyor and thus impair the quality of the products.

As a solution, it is conceivable to provide separate drives for the processing machines and for the conveyor. However, because of the operating sequence required for the entire installation, the two drives would need to be carefully synchronized with one another. Such synchronization could be accomplished by electrical or electronic means, although this has proven less desireable from a cost standpoint as compared to a mechanical coupling.

Compensation for variable inertia forces through a push-pull modulation of corresponding flywheel masses is disclosed in West German Pat. No. 26 57 861, and U.S. Pat. Nos. 2,211,418 and 2,861,635. However, the drives as therein disclosed take up a great deal of space, so that they are quite unsuitable for a sheet conveying and discharge system. The drive disclosed in U.S. Pat. No. 4,260,144, which is provided with a particular crank gear to meet the requirements for the conveyor drum in a folder, also requires so much space that it cannot be effectively used as the drive for a sheet conveyor.

SUMMARY OF THE INVENTION

The need for an economical and compact drive with non-uniform mass motion, which is suitable for a sheet conveyor, is satisfied by the present invention. The aforementioned problems are solved by the provision of a drive for the sheet conveyor which includes a first tape guide system for conveying the sheets to a pick up station and being driven at a constant and uniform speed of the processing machine, and a second tape guide system including a roll journal of a tape guide driven at a variable speed for conveying sheets from the pick-up station and delivering them from the machine at a decelerated speed. The drive arrangement of the invention includes a pair of interconnected planetary gear drives in which the cross-pieces or crank levers thereof are interconnected, the internal gearing of the second planetary gear train counter-rotating with respect to the internal gearing of the first planetary gear train, and the sun gear of the second planetary gear train being connected to a flywheel mass. The sun gear of the first planetary gear train comprises a power take-off connected to the roll journal of the tape guide roll, and the internal gearing of both gear trains are uniformly driven for respective counter-rotation while the connected planetary gears are driven non-uniformly. The crank levers of the planetary gear drives may comprise a single element.

The entire installation, comprising the processing machine and the conveyor, is made to operate in accordance with the invention at a higher line speed than heretofore made possible. Thus, the productivity of the entire installation increases correspondingly.

BRIEF DESCRIPTION OF THE DRAWINGS

FIG. 1 is a schematic view, in side elevation, of a sheet conveyor which includes various tape guides and which is connected to a machine (not shown) adapted for processing the sheets;

FIG. 2 is a detail view, in vertical section, of a typical disc roll of the conveyor for accommodating oppositely moving tape guides thereon;

FIG. 3 is a top plan view of the disc roll of FIG. 2 and including finger elements of a switch;

FIG. 4 is a sectional view of a portion of the collecting cylinder of the conveyor having spaced circumferential grooves for accommodating the fingers of FIG. 3;

FIGS. 5, 6 and 7 are respectively sectional views taken sbustantially along the lines 5—5, 6—6 and 7—7 of FIG. 1;

FIGS. 5A, 6A and 7A are, respectively, alternatives to FIGS. 5, 6 and 7 arrangements;

DETAILED DESCRIPTION OF THE INVENTION

Figure 8:
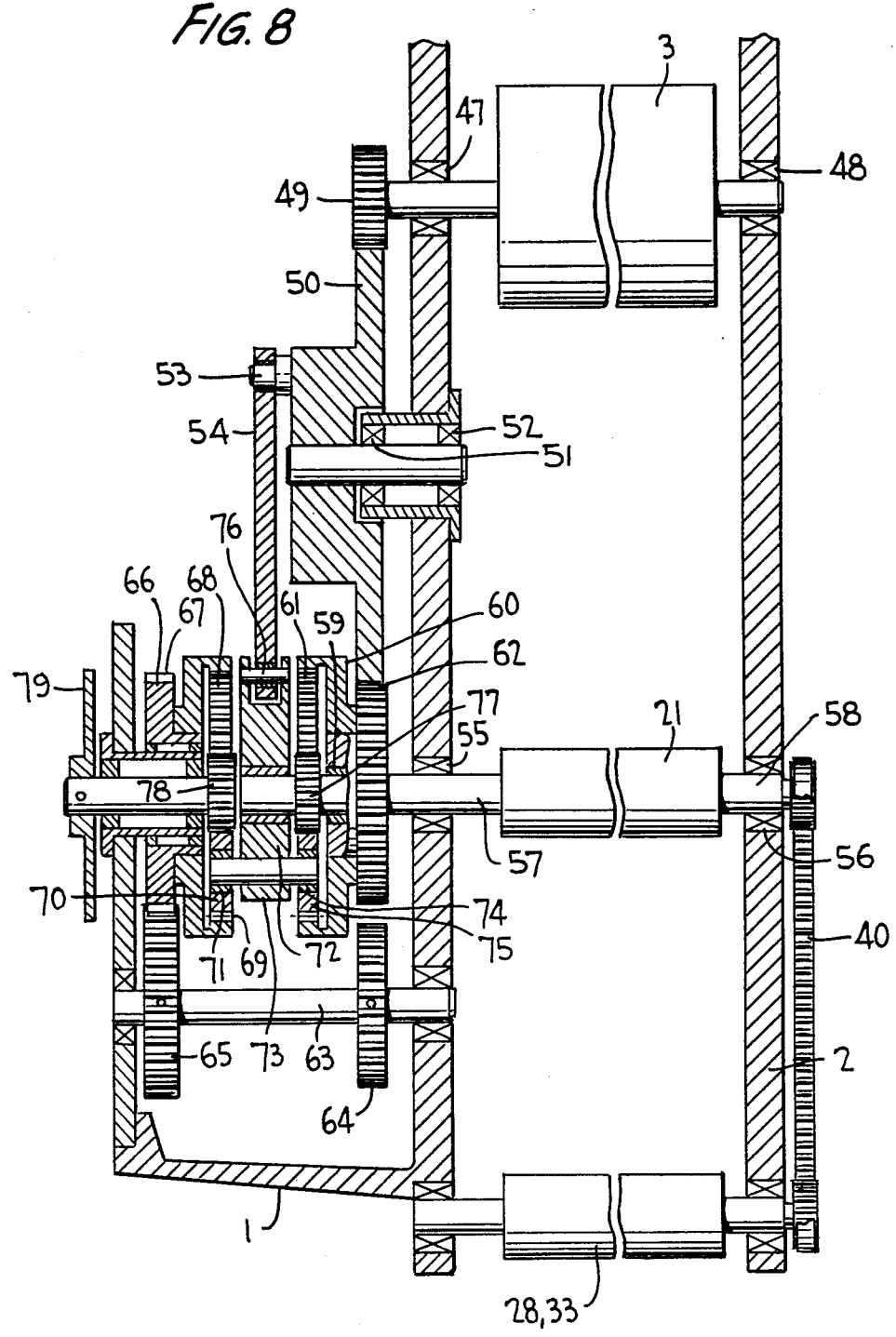
FIG. 8 is an expanded, vertical sectional view of the planetary gear drive for the sheet conveyor.

In the drawings, the non-essential machine components, which are sufficiently well known to the person having skill in this art, are not shown in the interest of clarity. Only those parts are shown which are necessary for the detailed description of the invention.

Turning now to the drawings wherein like reference characters refer to like and corresponding parts throughout the several views, the sheet processing machine to which the sheet conveyor of FIG. 1 is connected includes a pair of spaced side walls 1 and 2 but is not otherwise shown in the drawings for the sake of clarity. A sheet collecting cylinder 3 is journalled at its ends between the machine side walls, and is driven at a constant speed by a drive means (not shown) of the machine in any suitable manner known to those having ordinary skill in this art. The collecting cylinder is part of a first tape guide system which conveys the sheets and accumulates them in a stack of five, for example, at a pick-up station, whereafter a second tape guide system, intermittently driven at a non-uniform speed, picks-up the stack of sheets at the pick-up station and transfers them to a discharge station outwardly of the machine. The first tape guide system further comprises a first, endless tape guide 4 which is wrapped partially about collecting cylinder 3 which can either be heavy-walled or made of solid material to minimize torque variations. This first tape guide also extends partially about idler rolls 5 and 6 and bears against a tensioning roll 7 mounted at the free end of a lever arm 8 which is pivotally mounted to the machine frame by a rod 9 extending between the walls thereof. The first tape guide is further wrapped partially about a plurality of wheel-like discs 10 and 11 before wrapping about the collecting cylinder, these discs being mounted for free rotation respectively on rods 12 and 13 fixedly mounted on the machine frame. Tape guide 4 comprises a plurality of narrow strips such as $4a$ to $4f$ shown in FIG. 3 which are substantially equal in width to the discs 10 on support rod 12. These tape strips extend across the width of the collecting cylinder, and are spaced apart from one another such that narrow tape strips of another tape guide may be interdigitated therewith. And, a greater of fewer number of tape strips may be provided for each tape guide, than that shown in the drawings, without departing from the invention.

For example, the narrow tape strips of the second tape guide 14 are wrapped partially about discs 11 mounted on support rod 13, in a manner similar to that shown in FIGS. 2 and 3 respecting tape guides 4 and 20 which are wrapped about disc 10 to facilitate tape movement in opposite directions about the axis of support rod 12. The second tape guide also extends partially about rolls 15 and 16, one of these rolls being arranged to be driven at the same constant speed as that of the collecting cylinder. The first tape guide system is comprised of the second tape guide as well as the third tape guide 17 which is likewise comprised of a plurality of narrow individual tapes as is all the tape guides described therein. This third tape guide is wrapped partially about rolls 18 and 19, and the individual strips $17a$ to $17f$ thereof are, as shown in FIG. 5, superimposed over the respective tape strips $14a$ to $14f$ of the second tape guide.

The aforementioned second tape guide system comprises fourth, fifth and sixth tape guides, fourth tape guide 20 comprising a plurality of narrow individual strips which are wrapped partially about driven roll 21, tension roll 22, idler roll 23 and several of the wheel-like discs 10 mounted on support arm 12 (see FIG. 3).

A support rod 24 is mounted between side walls 1 and 2 of the machine similarly as arms 12 and 13, and wheel-like discs 25 are mounted for free rotation thereon in a manner as similarly shown in FIG. 3. A fifth tape guide 26, comprising a plurality of narrow individual strips, is wrapped about alternate ones of discs of 25, about rolls 27, a roll 28 and a tension roll 29.

A sixth tape guide 30, likewise comprised of a plurality of narrow individual strips, is wrapped partially about several of discs 25 (so as to be interdigitated with the strips of tape 26 in a manner as similarly shown in FIG. 3), as well as about roll 28, a tension roll 31, a roll 32 and a return cylinder 33. Finally, a seventh tape guide 34, comprising a plurality of narrow individual strips, is wrapped partially about return cylinder 33, as well as about a roll 35, a tension roll 36 and a roll 37.

The first tape guide system, comprising collection cylinder 3, first tape guide 4, second tape guide 14 and third tape guide 17, are driven at a constant speed by the main drive of the processing machine. Roll 21, however, of the second tape guide system, is driven at a variable speed by the planetary gear drive shown in FIGS. 8 and 9 and discussed in more detail hereinafter. As a result, fourth tape guide 20 moves at a variable speed. Fifth tape guide 26, sixth tape guide 30 and seventh tape guide 34 also moves at variable speeds, since return cylinder 33 and roll 28 are driven from roll 21 via a toothed belt 40 (FIG. 8) or the like, and tape guides 26 and 30 are in direct contact with tape guide 20 (as shown in FIGS. 7 and 6), or are in contact with the fourth tape guide indirectly (as in FIGS. 7A and 6A) through a package of sheets to be deposited. The strips of tape guides 34 and 26 relative to the strips of tape guide 20 can be easily arranged by shifting them between their FIGS. 6 and 7 and FIGS. 6A and 7A positions, and by shifting lever arm 38, which supports roll 27, in the direction of the double arrow about support rod 39 mounted on the machine. Thus, the individual bands or strips of fourth tape guide 20 and fifth tape guide 26 may be superimposed as in FIG. 7, or may lie in a common plane as in FIG. 7A. In this FIG. 7A and in the FIG. 6A arrangements, the package of sheets to be discharged will be pressed into a wave form. And, this arrangement also serves as a means of coupling the individual tapes of the respective tape guides.

In operation, a sheet S moves to the left from the processing machine, as shown by the arrow in FIG. 1, to the upper side of the individual bands of second tape guide 14. During its further travel, each sheet moves between the superimposed bands $17a$ to $17f$ and $14a$ to 14f (FIG. 5), and thus travels to the left in the direction of collecting drum 3.

A plurality of individual fingers 41 of a switch are mounted on support rod 12 (FIGS. 1 and 3) and are initially inclined upwardly and away from cylinder 3. Thus, each sheet S will be pressed directly against the outer periphery of cylinder 3 by the undersurfaces of fingers 41. Each sheet then passes between the collecting cylinder and the individual bands of first tape guide 4. The sheet which has thus been picked up is conveyed in the direction of rotation of cylinder 3. It circulates with the collecting cylinder until it reaches pick-up station 42, at which it meets with the following sheet which has been moved to this station in the same manner as aforedescribed. Thus, with fingers 41 the switch remaining in an upwardly inclined position, the second sheet will be deposited onto the outside of the first sheet which has already been picked up, and thus passes to the first tape guide. The two sheets therefore lie on top of one another on the circumference of the collecting cylinder. Both sheets travel with the collecting cylinder until station 42 is reached. Here, one or several additional sheets can be picked up in the same manner as aforedescribed. Usually, four sheets are accumulated on cylinder 3, which may be combined with a fifth sheet at station 42. Before these five sheets can pass beyond tape guide 4, fingers 41 of the switch are rotated in any normal manner until they are depressed into annular grooves 46 (FIG. 4) provided in the outer surface of the collecting cylinder, provided that the sheets being collected thereon are of such a length as to not cover the entire surface of cylinder 3. By depressing fingers 41 to these grooves, they are brought into a substantially horizontal position. Thus, the package of sheets, can enter between fourth tape guide 20 and seventh tape guide 34. Because of the variable speed drive of these tapes, as well as of the fifth tape guide, the package of sheets, now comprising five sheets, is decelerated and moved past return cylinder 33 to a discharge station 43 which may comprise any suitable type container or receptacle, such as a box, a pallet or the like.

By means of a manual signal, a switch 44 can be rotated by a pneumatic or hydraulic cylinder 45 for the purpose of freeing the package of collected sheets from the hold of fourth tape guide 20 and seventh tape guide 34, and introducing the package between seventh tape guide 34 and sixth tape guide 30. Thus, the package of sheets to be discharged can be fed to a second discharge station 46 which is advantageous when a sufficiently large stack has been accumulated at the discharge station 43 and the filled retainer or receptacle thereat must be replaced. In addition, the packages of sheets can be diverted to second discharge station 46 when samples are to be taken from the run.

It should be pointed out that all of the guide rolls of the various tape guides as aforedescribed are designed to freely rotate, and all the support rods for the freely rotatable discs are fixedly mounted on side walls 1 and 2 of the machine frame.

As shown in FIG. 8, collecting drum 3 is rotatably journalled in bearings 47 and 48 between side walls 1 and 2 of the machine frame. And, gear 49 is fixedly mounted on the collecting drum journal for rotation therewith as it is continuously driven by the main drive of the main machine.

Gear 49 is in meshing engagement with a larger gear 50 having, for example, five times the number of gear teeth than gear 49 if five sheets are to be discharged simultaneously as a package. Gear 50 is rotatably mounted on side wall 1 via bearings 51 and 52. And, a crank pin 53 extends from gear 50 and is engaged by a connecting rod 54 via a bearing.

Bearings 55 and 56 in side walls 1 and 2 of the machine support journals 57 and 58 of driven roll 21 for rotation between the frame side walls.

A two-part internal gear 60 (with the parts fixedly interconnected) of a first planetary gear drive is rotatably mounted on journal 57 via bearing 59. This internal gear has both internal gearing 61 and external gearing 62, the latter being in toothed engagement with gear 50.

Figure 9:
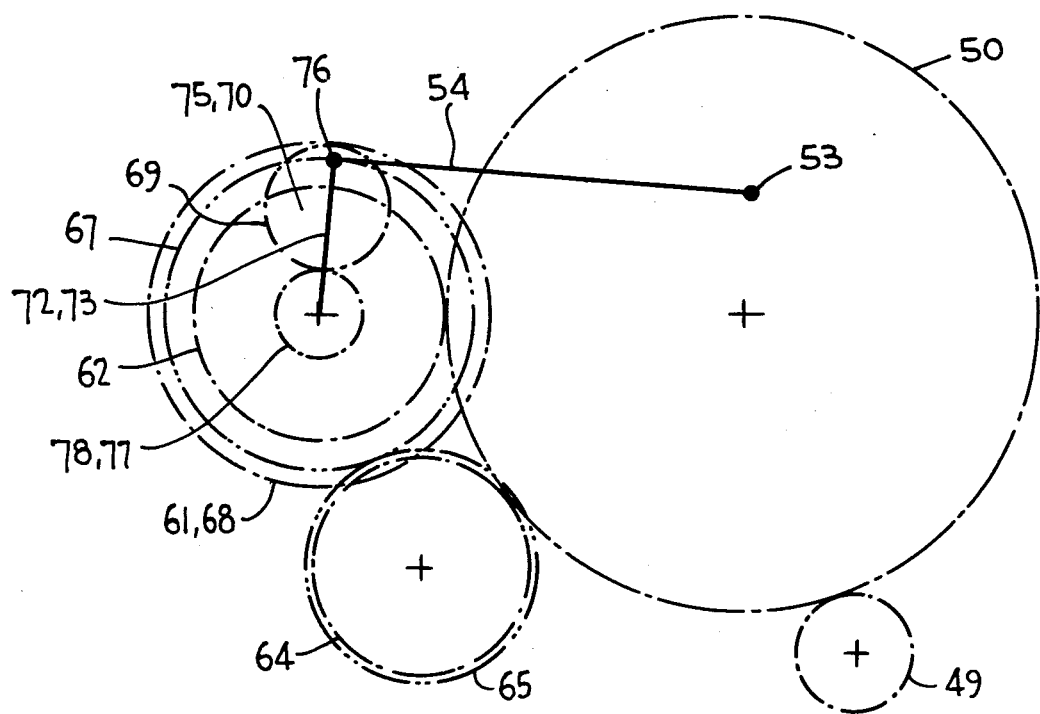
FIG. 9 is a schematic illustration in side elevation of the planetary gear train of FIG. 8, a first planetary gear train and its drive being shown in dot-dash outline, a second planetary gear drive being shown in dot-dot-dash outline, and a variable speed drive being shown in solid outline.

A shaft 63 is mounted in side wall 1 in such manner that a gear 64, fixedly mounted thereon, is in toothed engagement with gear 50, as shown in FIG. 9. It should be pointed out that, for the purpose of clarity, this gear 64 is not shown in engagement with gear 50, FIG. 8 being an expanded view. Another gear 65 is fixedly mounted on shaft 63 for rotation therewith and engages a two-part internal gear 66 of a second planetary gear drive at its external gearing 67. And, internal gearing 68 thereof engages a gearing 69 of at least one planetary gear 70 of the second planetary gear drive. However, more than one planetary gear may be provided without departing from the invention. And, planetary gear 70 of the second planetary gear drive is fixed to a crank arm 72 via a journal and bearing 71. This crank arm or cross-piece 72 is connected to a crank arm or cross-piece 72 of the first planetary gear drive, and the two cross-pieces preferably comprise a single element as shown in FIG. 8. And, a planetary gear (or gears) 75 of the first planetary gear drive is rotatably mounted on crank arm 73 via a bearing 74. Moreover, both planetary gears 70 and 75 are respectively in toothed engagement with gearing 69 and 61 of the second and first internal gears.

Crank arm 72, 73 of the combined planetary gear train comprising the first and second planetary gear drives, is pivotally secured to connecting rod 54 by a pin 76.

An inner sun gear 77 of the first gear drive is fixedly mounted on journal 57 of roll 21 for rotation therewith. And, an inner sun gear 78 of the second planetary gear drive has a journal on which a disc flywheel 79 is fixedly mounted. Since the sheet conveyor includes moving endless tapes or bands, the masses moving at non-uniform speeds are relatively low. Thus, disc flywheel 79 may be of a relatively small size.

Since internal gear 60 of the first planetary gear drive is driven directly from gear 50, and since internal gear 66 of the second planetary gear drive is indirectly driven via gears 64 and 65, internal gear 66 of the second planetary gear drive rotates in an opposite direction of gear 60 of the first planetary gear drive, although both gears 60 and 66 rotate at continuous and uniform speeds. Furthermore, since crank pin 53 is fixedly secured to gear 50 and connecting rod 54 is connected to crank pin 53 and to crank arm or cross-piece 72, 73 of the two planetary gear drives, the crank arm is intermittently driven upon the circulatory movements of the crank pin. And, it should be pointed out that, as shown in FIG. 8, the planetary gear driven train which functions to drive the tapes of the second tape guide system an non-uniform speeds, is quite compact and has few voids.

And, since internal gears 60 and 66 of the two planetary gear drives rotate in opposite directions, and since crank arm 72, 73 of the two gear drives are interconnected or comprise a single element, and the gear ratios are appropriately selected, inner sun gears 77 and 78 are made to likewise rotate in opposite directions. Thus, disc flywheel 79 accelerates during its rotation when the rotation of roll 21 decelerates, and the rotation of the disc flywheel decelerates when the rotation of roll 21 accelerates. This results in a strong dampening of the inertia forces resulting from acceleration and deceleration of the tape guides of the second tape guide system. These forces are further reduced for the reason that guide tapes rather than chains are utilized for the second tape guide system.

Obviously, many other modifications and variations of the present invention are made possible in the light of the above teachings. It is therefore to be understood that within the scope of the appended claims the invention may be practiced otherwise than as specifically described.

What is claimed is:

1. An arrangement for the drive of a sheet conveyor connected to a machine adapted for processing sheets of paper, film, fabrics, metals, or the like, the conveyor including a collecting cylinder and a first tape guide system for conveying the sheets to a pick-up station and being driven at a constant speed by a drive means of the machine, a second tape guide system including a roll journal of a tape guide roll driven at a variable speed for conveying the sheets from the pick-up station and delivering them from the machine at a decelerated speed, the arrangement comprising a planetary gear train including first and second planetary gear drives, including internal gears rotatable about the axis of said roll journal, planetary gears rotatable within said internal gears and sun gears rotatable within said planetary gears, means for uniformly rotating said internal gears in opposite directions about said axis, said sun gear of said first gear drive being mounted on said roll journal, a flywheel mounted on said sun gear of said second gear drive for rotation therewith, and means for intermittently driving said planetary gears for driving said second tape guide system at said variable speed as said sun gears rotate in said opposite directions about said axis, said intermittent driving means including crank lever means interconnecting said sun gears with said uniform rotation means, whereby inertia forces resulting from the intermittent drive of said second tape guide system are substantially dampened by the counter-rotation of said flywheel relative to said tape guide roll.

2. The arrangement according to claim 1, wherein said crank lever means comprise a single crank arm for said gear drives.

* * * * *